United States Patent
Huang et al.

(10) Patent No.: US 10,207,940 B2
(45) Date of Patent: Feb. 19, 2019

(54) COMPOSITE WATER PURIFICATION APPARATUS AND METHOD THEREOF

(71) Applicant: National Chiao Tung University, Hsinchu (TW)

(72) Inventors: Chih-Pin Huang, Hsinchu (TW); Chien-Hung Chen, Taiwan (TW); Hsin-Ju Yang, Taiwan (TW); Chi-Chang Hu, Taiwan (TW); Wei-Chieh Lin, Taiwan (TW)

(73) Assignee: National Chiao Tung University, Hsinchu (TW)

(*) Notice: Subject to any disclaimer, the term of this patent is extended or adjusted under 35 U.S.C. 154(b) by 286 days.

(21) Appl. No.: 15/207,701

(22) Filed: Jul. 12, 2016

(65) Prior Publication Data
US 2017/0057847 A1 Mar. 2, 2017

(30) Foreign Application Priority Data

Aug. 28, 2015 (TW) .............................. 104128284 A (51) Int. Cl.
  *C02F 1/32* (2006.01)
  *C02F 1/72* (2006.01)
  *C02F 1/467* (2006.01)

(52) U.S. Cl.
  CPC ............ *C02F 1/4672* (2013.01); *C02F 1/725* (2013.01); *C02F 1/325* (2013.01); *C02F 2201/32* (2013.01); *C02F 2305/10* (2013.01)

(58) Field of Classification Search
  CPC ...... C02F 1/001; C02F 1/46109; C02F 1/463; C02F 2303/04; C02F 2001/46142; C02F 2001/46161; C02F 2201/46135
  USPC .............. 210/748.1, 748.14; 204/155, 280
  See application file for complete search history.

(56) References Cited

U.S. PATENT DOCUMENTS

| | | | | |
|---|---|---|---|---|
| 4,361,471 A * | 11/1982 | Kosarek | ................ | C02F 1/4674 204/265 |
| 5,531,865 A * | 7/1996 | Cole | .................... | C02F 1/46109 204/237 |
| 2003/0106854 A1* | 6/2003 | Robinson | ................ | C02F 1/463 210/748.18 |
| 2005/0183964 A1* | 8/2005 | Roberts | ..................... | B03C 5/02 205/701 |
| 2009/0321251 A1* | 12/2009 | Rigby | ................... | C02F 1/4602 204/229.6 |
| 2010/0187122 A1* | 7/2010 | Zolotarsky | ............ | C02F 1/4674 205/334 |

(Continued)

*Primary Examiner* — Ana M Fortuna
(74) *Attorney, Agent, or Firm* — Mintz Levin Cohn Ferris Glovsky and Popeo, P.C.; Peter F. Corless; Steven M. Jensen (57) ABSTRACT

A composite water purification apparatus and method thereof are provided. The composite water purification apparatus includes a container, a sacrificial anode, a photocatalyst anode and a cathode. The container is employed for receiving liquid including water and gas. The photocatalyst anode includes a photocatalyst for conducting a photocatalytic reaction. The cathode is electrolyzed with the sacrificial anode and the photocatalyst anode. The cathode, the sacrificial anode, and the photocatalyst anode are immersed in the container to contact the liquid. The present invention enhances the purity of the water, while prolonging the service life of the sacrificial anode.

17 Claims, 5 Drawing Sheets

(56) References Cited

U.S. PATENT DOCUMENTS

| | | | | |
|---|---|---|---|---|
| 2012/0160705 A1* | 6/2012 | Robinson | ................ | C02F 1/463 |
| | | | | 205/756 |
| 2012/0187122 A1* | 7/2012 | Glasow | ..................... | B65B 7/16 |
| | | | | 220/214 |
| 2012/0285892 A1* | 11/2012 | Tuckett | ..................... | C25B 1/04 |
| | | | | 210/703 |
| 2015/0191366 A1* | 7/2015 | Eckelberry | ............... | C02F 1/24 |
| | | | | 210/703 |
| 2016/0168743 A1* | 6/2016 | Yoon | ................... | H01G 9/2031 |
| | | | | 205/223 |
| 2017/0057847 A1* | 3/2017 | Huang | ................. | C02F 1/4672 |
| 2017/0100681 A1* | 4/2017 | Livingston | ........... | B01D 1/0017 |

* cited by examiner

FIG. 5

# COMPOSITE WATER PURIFICATION APPARATUS AND METHOD THEREOF

CROSS-REFERENCE TO RELATED APPLICATION

This application claims under 35 U.S.C. § 119(a) the benefit of Taiwanese Patent Application No. 104128284 filed Aug. 28, 2015, the entire contents of which are incorporated herein by reference.

BACKGROUND OF THE INVENTION

1. Field of the Invention

The present invention relates to composite water purification techniques, and, more particularly, to a composite water purification apparatus and method thereof that immerse a sacrificial anode, a photocatalyst anode and a cathode in the same container.

2. Description of Related Art

In the field of modern water treatment technology, the photocatalyst purification unit and the electrolytic purification unit are traditionally placed in separate containers. As a result, in a single container having only the photocatalytic purification unit or the electrolytic purification unit, treated water can only been subjected to degradation once. The performance would be substantially improved if degradation can happen more than once in a single container.

Further, since the photocatalyst contained the traditional photocatalytic purification unit is not electrically coupled to a power supply, after the photocatalyst produces strong oxidizing agents (e.g., electron holes and hydroxyl radicals), the strong oxidants and the excited electrons separated by light are often recombined, thereby significantly reducing the amount of strong oxidants produced.

Therefore, there is a need for a solution that addresses the issues associated with the photocatalyst purification unit and the electrolysis purification unit being placed in separate containers and the photocatalyst in the photocatalyst purification unit not electrically coupled to a power supply in the prior art.

SUMMARY OF THE INVENTION

In view of the aforementioned shortcomings of the prior art, the present invention provides a composite water purification apparatus, which may include: a container for receiving a liquid including water and gas; at least one sacrificial anode; at least one photocatalyst anode including a photocatalyst for conducting a photocatalytic reaction to purify the liquid; and at least a cathode electrolyzed with the sacrificial anode and the photocatalyst anode, wherein the sacrificial anode, the photocatalyst anode, and the cathode are immersed in the container to contact the liquid.

The present invention further includes a composite water purification method, which may include the following steps of: a) providing a composite water purification apparatus including a container, at least one sacrificial anode, at least one photocatalyst anode, and at least one cathode, wherein the photocatalyst anode includes a photocatalyst, and the sacrificial anode, the photocatalyst anode, and the cathode are immersed in the container; b) inputting a liquid including water and gas into the container, such that a photocatalytic reaction is conducted at the sacrificial anode, the sacrificial anode produces sacrificial ions in a lower oxidation state, and the cathode produces hydrogen peroxide ($H_2O_2$) by using the liquid and the gas; c) interacting sacrificial ions in a lower oxidation state with hydrogen peroxide to form sacrificial ions in a higher oxidation state, a strong oxidizing agent (.OH), and hydroxide ions ($OH^-$), the strong oxidizing agent purifying the liquid; d) conducting a photocatalytic reaction, by the photocatalyst anode, such that the liquid produces another strong oxidizing agent (.OH); and e) outputting the purified liquid.

Therefore, by immersing the sacrificial anode, the photocatalyst anode, and the cathode all in the same container, the purification process of the liquid is enhanced. Besides, the present invention allows the sacrificial ions in a higher oxidation state to be reduced back to a lower oxidation state at the cathode, thus prolonging the life of the sacrificial anode.

DETAILED DESCRIPTION OF THE EMBODIMENTS

The present invention is described by the following specific embodiments. Those with ordinary skills in the arts can readily understand other advantages and functions of the present invention after reading the disclosure of this specification. The present disclosure may also be practiced or applied with other different implementations. Based on different contexts and applications, the various details in this specification can be modified and changed without departing from the spirit of the present disclosure.

Figure 1:
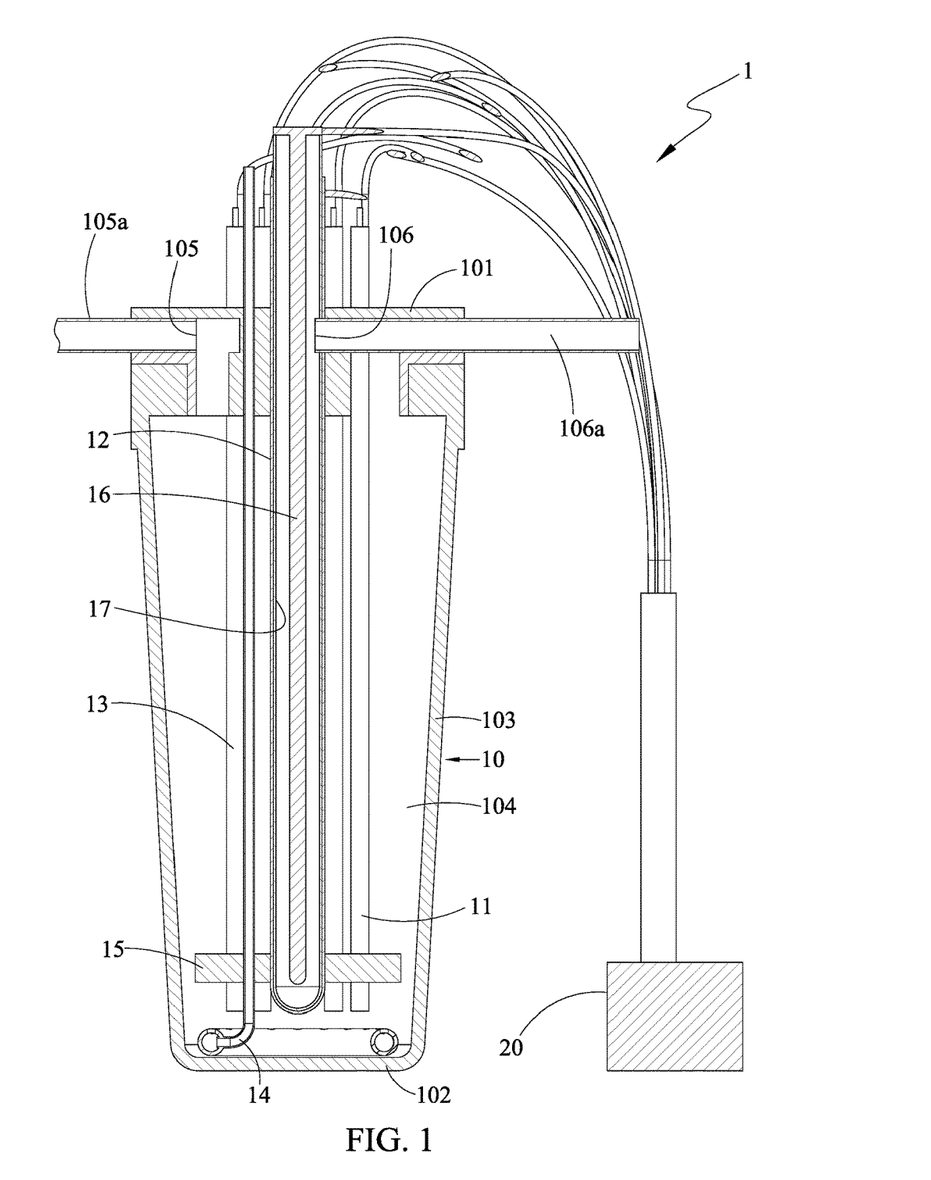
FIG. 1 is a cross-sectional view of a composite water purification apparatus in accordance with the present invention.
Figure 2:
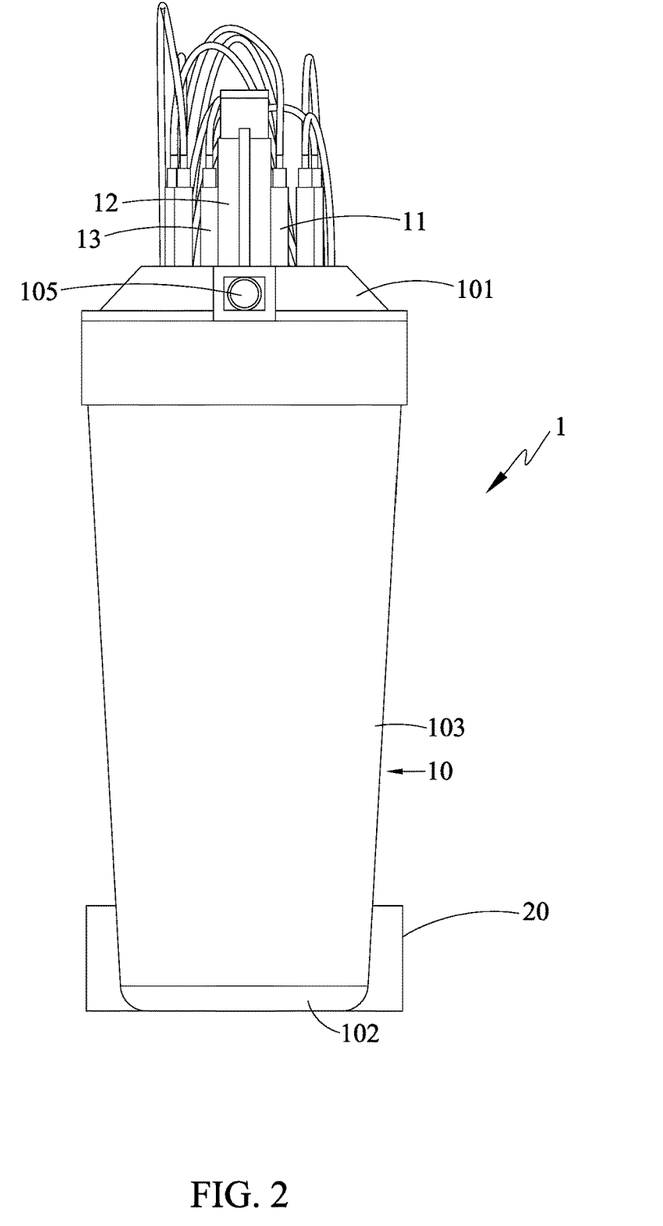
FIG. 2 is a lateral view of a composite water purification apparatus in accordance with the present invention.

FIG. 1 is a cross-sectional view of a composite water purification apparatus 1 in accordance with the present invention. FIG. 2 is a lateral view of the composite water purification apparatus 1 in accordance with the present invention. The composite water purification apparatus 1 includes a container 10, at least one sacrificial anode 11, at least one photocatalyst anode 12, and at least one cathode 13.

The container 10 is used for receiving liquid including water and gas. The photocatalyst anode 12 includes a photocatalyst for conducting a photocatalytic reaction for purifying the liquid. The cathode 13 is used in conjunction with both the sacrificial anode 11 and the photocatalyst anode 12 for electrolysis. The sacrificial anode 11, the photocatalyst anode 12, and the cathode 13 are all immersed in the container to be in contact the liquid.

In an embodiment, the container 10 includes a top part 101, a bottom part 102 opposite to the top part 101, and a lateral part 103 connecting the top part 101 and the bottom part 102, and the top part 101, the bottom part 102, and the lateral part 103 constitute a chamber 104 for receiving the liquid including water and gas (i.e., water including gas dissolved therein).

Furthermore, the container 10 has an inlet 105 and an outlet 106. In an embodiment, the top part 101 and the lateral part 103 may be formed integrally. Alternatively, the top part 101 may be a lid that fits with the lateral part 103, and the inlet 105 and the outlet 106 may be disposed at any positions of the container 10, depending on the needs. In an embodiment, the inlet 105 and the outlet 106 may be positioned on the top part 101. The inlet 105 may be further connected to an externally-connecting tube 105a. The outlet 106 may be further connected to an externally-connecting tube 106a. The tube 105a or 106a may be a pipe or a conduit.

The sacrificial anode 11 may be electrically coupled to a power supply 20 attached in or external to the composite water purification apparatus 1 via a wire in order for electrolysis to occur. In an embodiment, the sacrificial anode 11 may be made of iron or copper. Under the circumstance that the power supply 20 is providing power, the sacrificial anode 11 may produce sacrificial ions in a lower oxidation state with the liquid similar to the following chemical formula (1). For example, in the case that the sacrificial anode 11 is made of iron or copper, the sacrificial ions in a lower oxidation state may be ions in an oxidation state of +2 ($Fe^{2+}$) or +1 ($Cu^+$). The following chemical formula (1) is exemplified with iron as the sacrificial anode 11:

$$Fe \rightarrow Fe^{2+} \tag{1}$$

The cathode 13 may be also electrically coupled to the power supply 20 attached in or external to the composite water purification apparatus 1 via a wire in order for electrolysis to occur. In an embodiment, the cathode 13 is made of a material containing carbon. The sacrificial anode 11 and the cathode 13 may be in the shapes of columns, sheets, strips, tubes, etc. Under the circumstance that the power supply 20 is providing power, the cathode 13 may produce hydrogen peroxide ($H_2O_2$) with the liquid similar to the following chemical formula (2).

$$2H^+ + O_2 + 2e^- \rightarrow H_2O_2 \tag{2}$$

After the sacrificial ions in a lower oxidation state and hydrogen peroxide are produced, the sacrificial ions in a lower oxidation state and hydrogen peroxide in the liquid may interact with each other, and produce sacrificial ions in a higher oxidation state, a strong oxidizing agent (.OH) and hydroxide ions ($OH^-$) similar to the following chemical formula (3). The strong oxidizing agent can purify the liquid by degrading the liquid once. For example, if the sacrificial anode 11 is made of iron or copper, the sacrificial ions in a higher oxidation state are ions in an oxidation state of +3 ($Fe^{3+}$) or +2 ($Cu^{2+}$). The following chemical formula (3) is exemplified with iron as the sacrificial anode 11:

$$Fe^{2+} + H_2O_2 \rightarrow .OH + Fe^{3+} + OH^- \tag{3}$$

Since in the present invention the sacrificial anode 11 and the cathode 13 are disposed in the same chamber 104, the sacrificial ions in a higher oxidation state may further be reduced back to sacrificial ions in a lower oxidation state at the cathode 13 similar to the following chemical formula (4), thereby providing more sacrificial ions in a lower oxidation state to undergo the chemical formula (3). As a result, the number of the sacrificial ions in a lower oxidation state required from the sacrificial anode 11 in the chemical formula (1) is reduced, the loss of the sacrificial anode 11 is decreased, and the service life of the sacrificial anode 11 is extended. The following chemical formula (4) is exemplified with iron as the sacrificial anode 11:

$$Fe^{3+} + e^- \rightarrow Fe^{2+} \tag{4}$$

The photocatalyst anode 12 includes a photocatalyst. In an embodiment, the photocatalyst anode 12 includes a mesh substrate and a titanium dioxide ($TiO_2$) layer on the mesh substrate for conducting a photocatalytic reaction for purifying the liquid. In an embodiment, the mesh substrate can be a stainless steel mesh substrate or a titanium mesh substrate. Under external background light, the photocatalyst anode 12 may produce a strong oxidizing agent from the water-containing liquid similar to the following chemical formula (5), such that the liquid undergoes degradation for a second time. The following chemical formula (5) is exemplified with titanium dioxide photocatalyst anode 12:

$$TO_2 + H_2O \xrightarrow{h\nu} e + TiO_2^+ + H_2O \longrightarrow e + TiO_2 + \cdot OH + H^+ \tag{5}$$

The photocatalyst anode 12 is electrically coupled to the power supply 20 via a wire, such that the strong oxidizing agent and the electrons produced from excitation by the external background light are pulled away from each other by the electrical field, thus reducing the occurrence of recombination and maintaining the quantity of the strong oxidizing agent.

In an embodiment, the composite water purification apparatus 1 according to the present invention further includes a light source 16 electrically coupled to the power supply 20 via a wire for facilitating a photocatalytic reaction of the photocatalyst anode 12. The photocatalytic reaction of the photocatalyst anode 12 is strengthened by the light source 16. In an embodiment, the light source 16 may be an ultraviolet (UV) lamp for facilitating photocatalytic reaction of the photocatalyst anode 12 that enhances the purification. With the UV lamp, the photocatalytic reaction of the photocatalyst anode 12 is strengthened. When the light source 16 is present, the composite water purification apparatus 1 further includes a light-transmissive element 17 that achieves an evener irradiation of the light source 16. The light-transmissive element 17 is positioned between the light source 16 and the photocatalyst anode 12. Furthermore, when the light source 16 is present, the photocatalyst anode 12 may be positioned in such a way that it surrounds the light source 16.

In an embodiment, the composite water purification apparatus 1 according to the present invention further includes an aeration element 14 disposed inside the chamber 104 of the container 10 for feeding additional gas into the liquid. The additional gas may be air or oxygen used in the chemical formula (2).

In an embodiment, the composite water purification apparatus 1 according to the present invention further includes a securing element 15 in the chamber 104 of the container 10 for holding the sacrificial anode 11, the photocatalyst anode 12, and the cathode 13 in place.

Figure 3:
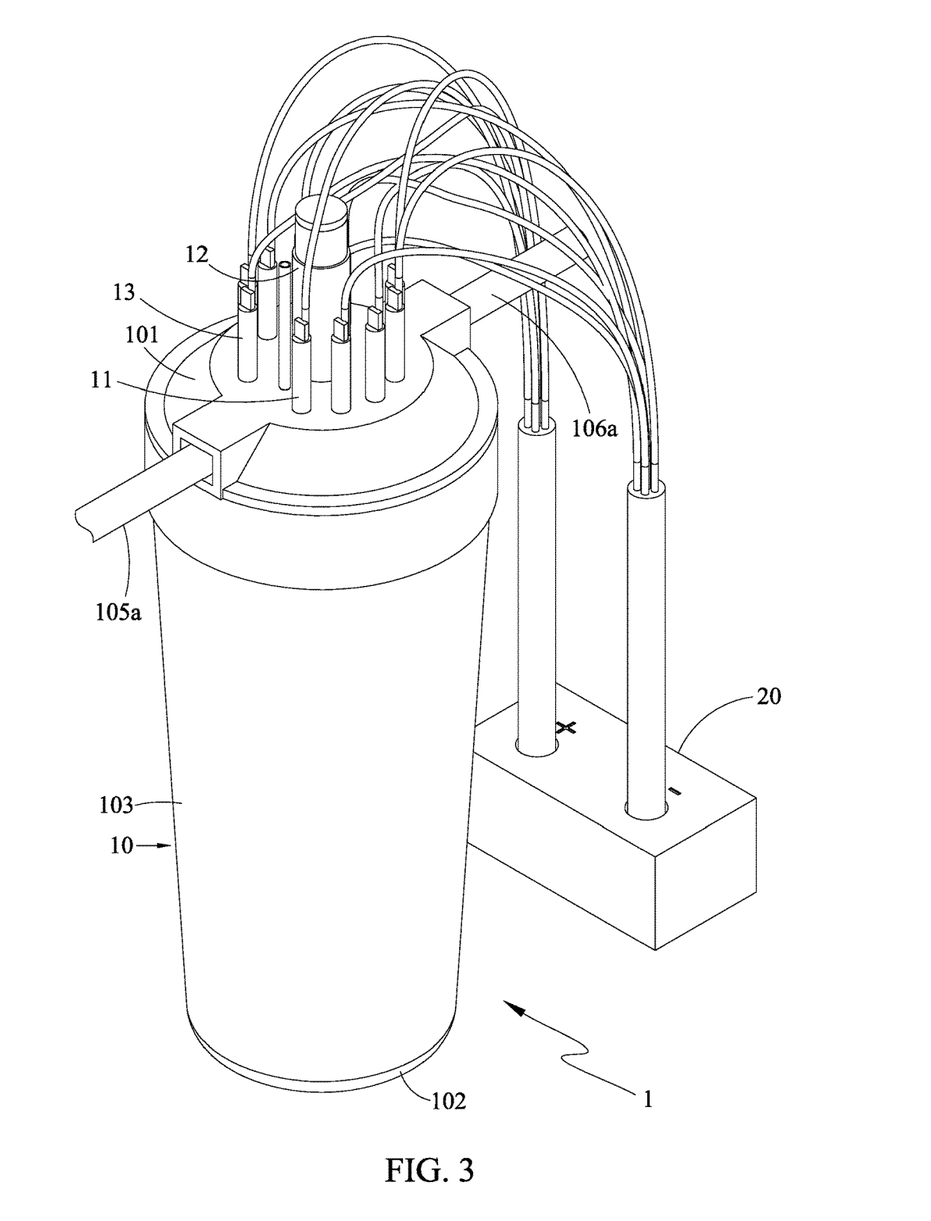
FIG. 3 is a perspective view of a composite water purification apparatus in accordance with the present invention.

FIG. 3 is a perspective view of the composite water purification apparatus 1 in accordance with the present invention. In an embodiment, the inlet 105, the sacrificial anode 11 and the cathode 13, the photocatalyst anode 12, and the outlet 106 correspond to a position of the top part, and are arranged in an order from an outer rim to a center of the top part 101.

In an embodiment, the sacrificial anode 11 and the cathode 13 are not limited to be positioned from the lateral part 103 by the same distance, as long as the distance of the set of the sacrificial anode 11 and the cathode 13 from the lateral part 103 is between that of the inlet 105 and that of the photocatalyst anode 12. In other words, the arrangement of the various elements from the lateral part 103 may be as follows: the inlet 105, the sacrificial anode 11, the cathode 13, the photocatalyst anode 12, and the outlet 106; or the inlet 105, the sacrificial anode 11 and the cathode 13, the photocatalyst anode 12, and the outlet 106; or the inlet 105, the cathode 13, the sacrificial anode 11, the photocatalyst anode 12, and the outlet 106. The outlet 106 may be connected to a pump (not shown).

Figure 4:
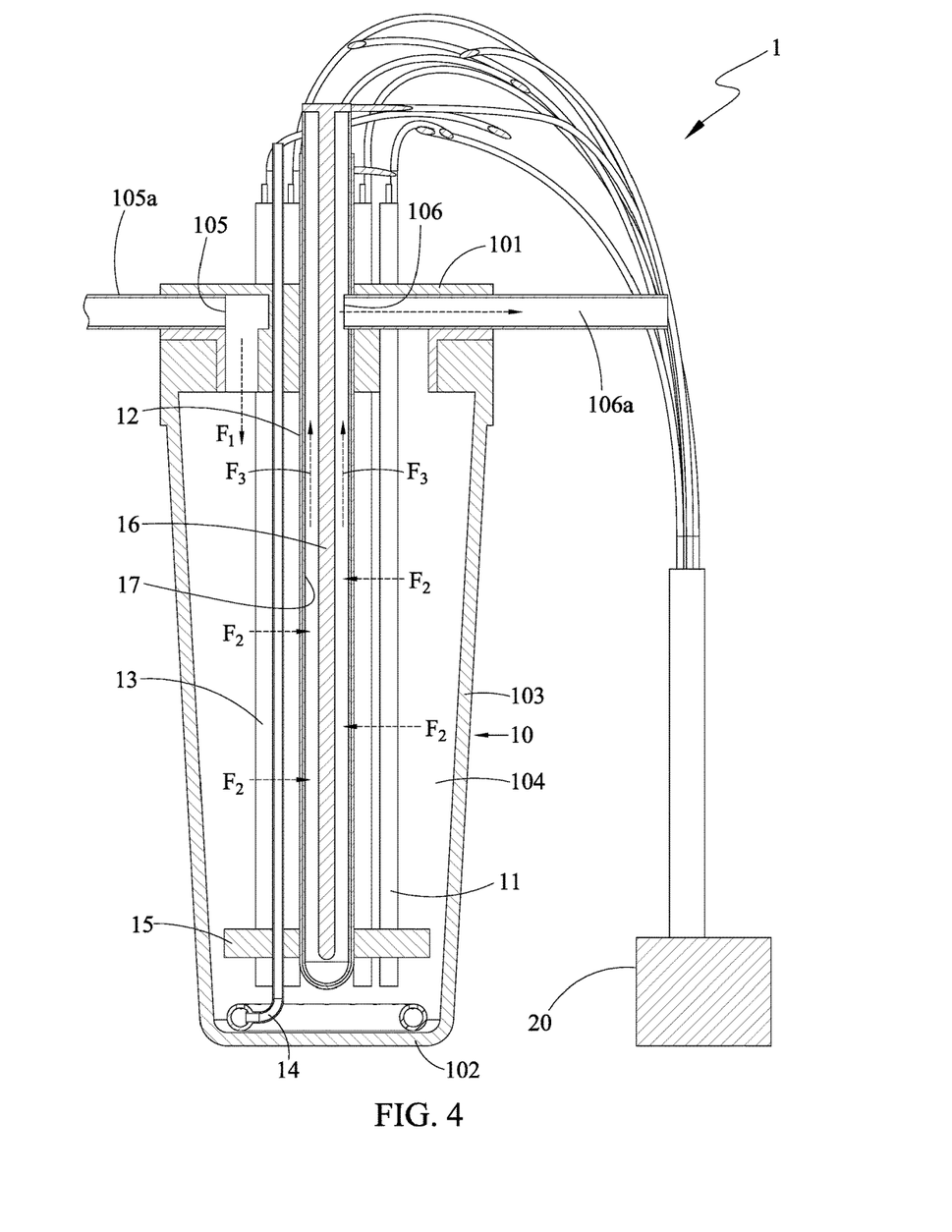
FIG. 4 is a cross-sectional view depicting the direction of the liquid flow when a composite water purification apparatus in accordance with the present invention is in operation.

FIG. 4 is a cross-sectional view depicting the direction of the liquid flow when the composite water purification apparatus 1 in accordance with the present invention is in operation. As shown, the direction of the liquid flow going into the inlet 105 is indicated as $F_1$, and the liquid undergoes chemical reactions at the sacrificial anode 11 and the cathode 13 in accordance with the above formulae (1) and (2). Before going through the photocatalyst anode 12, the liquid undergoes a chemical reaction in accordance with formula (3), such that it is degraded for a first time. When going through the photocatalyst anode 12 (i.e., direction $F_2$), the liquid undergoes a chemical reaction in accordance with the formula (5), such that the liquid is degraded for a second time. Finally, the twice-degraded liquid is discharged from the outlet 106 (i.e., direction $F_3$). However, when the light source 16 is present, the outlet 106 may be positioned between the photocatalyst anode 12 and the light source 16.

In another embodiment of the composite water purification apparatus 1 according to the present invention, in the case that the photocatalyst anode 12 includes a mesh substrate and a titanium dioxide layer, the mesh substrate allows the twice-degraded liquid to pass therethrough, and the outlet 106 may be positioned between the photocatalyst anode 12 and the set of the sacrificial anode 11 and the cathode 13. In an embodiment, the outlet 106 is connected to a pump to help extract the twice-degraded liquid from the outlet 106 after it has passed through the photocatalyst anode 12.

In still another embodiment of the composite water purification apparatus 1 according to the present invention, corresponding to the position of the top part 101, the inlet 105, the outlet 106, the sacrificial anode 11, the photocatalyst anode 12, and the cathode 13 may be arranged from the rim towards the center of the top part 101 in another order as follows: the cathode 13, the outlet 106, the sacrificial anode 11, the photocatalyst anode 12, and the outlet 106. The outlet 106 can be connected to a pump (not shown). As a result, the liquid entering the inlet 105 can undergo chemical reactions in accordance with the formulae (1) to (3) between the sacrificial anode 11 and the cathode 13 and before going through the photocatalyst anode 12, such that the liquid is degraded for a first time. The liquid undergoes a chemical reaction in accordance with the formula (5) when passing through the photocatalyst anode 12, such that the liquid is degraded for a second time. Finally, the twice-degraded liquid is discharged from the outlet 106. Moreover, when the light source 16 is present, the outlet 106 may be positioned between the photocatalyst anode 12 and the light source 16. Furthermore, the outer surface of the cathode 13 facing the inner wall of the container 10 (i.e., the chamber 104) can be hydrophobic, and the inner surface opposite to the outer surface may be hydrophilic.

Figure 5:
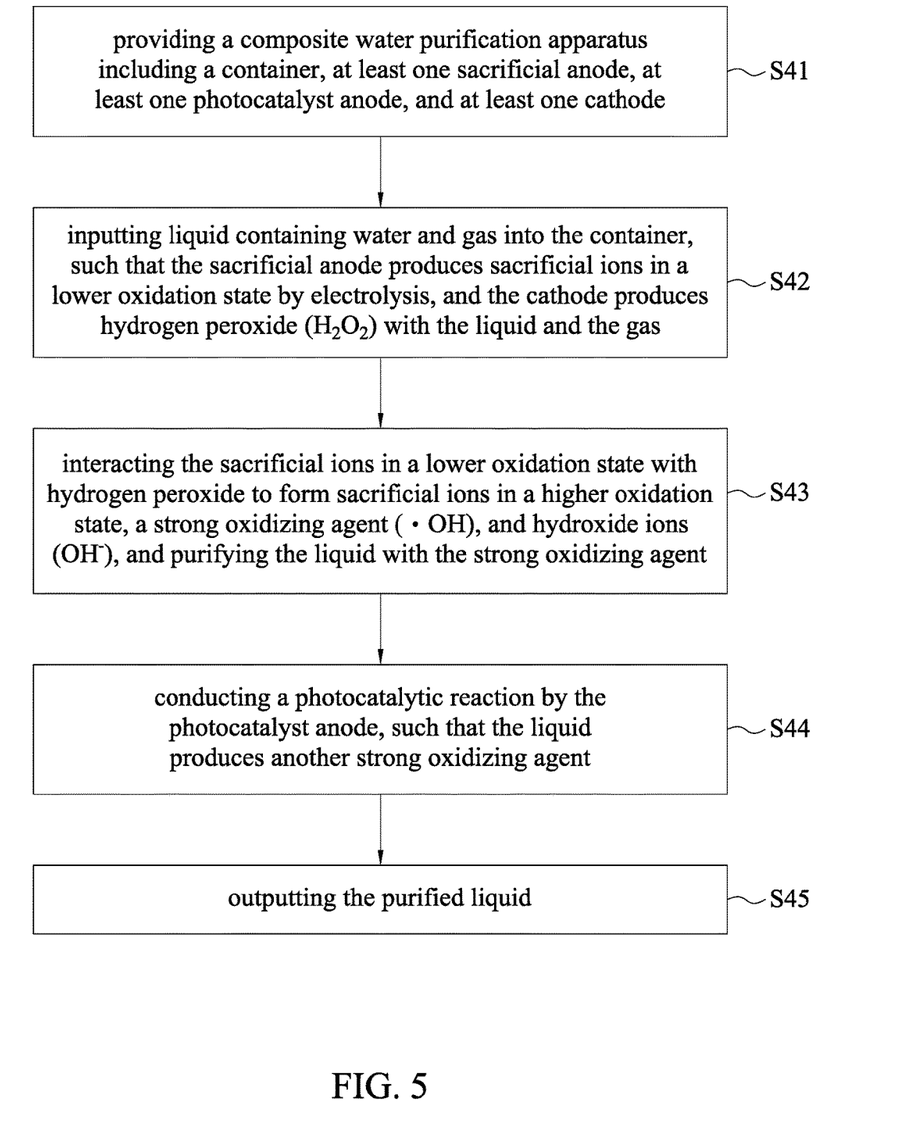
FIG. 5 is a flowchart illustrating the steps of a composite water purification method in accordance with the present invention.

FIG. 5 is a flowchart illustrating the steps of a composite water purification method in accordance with the present invention. The method employs the composite water purification apparatus 1 with respect to FIGS. 1 to 4 as mentioned earlier. The various components of the composite water purification apparatus 1 have already been discussed, further description hereby omitted. The composite water purification method may include steps S41 to steps S45.

In step S41, a composite water purification apparatus 1 including a container 10, at least one sacrificial anode 11, at least one photocatalyst anode 12, and at least one cathode 13 is provided, wherein the photocatalyst anode 12 includes a photocatalyst, and the sacrificial anode 11, the photocatalyst anode 12, and the cathode 13 are all immersed in the container 10. The sacrificial anode 11, the photocatalyst anode 12, and the cathode 13 are electrically coupled to a power supply 20 via wires, such that the power supply 20 provides power to the sacrificial anode 11 and the cathode 13 for electrolysis, and the power supply 20 also helps in removing electrons from the photocatalyst anode 12 isolated by the photocatalytic reaction.

In step S42, a liquid containing water and gas is inputted, such that the sacrificial anode 11 produces sacrificial ions in a lower oxidation state (i.e., the chemical formula (1) using iron as the sacrificial anode 11) by electrolysis, and the cathode 13 produces hydrogen peroxide ($H_2O_2$) with the liquid and the gas (i.e., the chemical formula (2)).

In step S43, the sacrificial ions in a lower oxidation state and hydrogen peroxide interact with each other to form sacrificial ions in a higher oxidation state, a strong oxidizing agent (.OH), and hydroxide ions ($OH^-$) (i.e., the chemical formula (3) using iron as the sacrificial anode 11), and the strong oxidizing agent purifies the liquid. Moreover, after being formed in a higher oxidation state, the sacrificial ions are reduced back to sacrificial ions in a lower oxidation state at the cathode 13 (i.e., the chemical formula (4) using iron as the sacrificial anode 11), thereby providing additional sacrificial ions in a lower oxidation state to the chemical formula (3), and reducing the number of the sacrificial ions in a lower oxidation state required from the sacrificial anode 11 in the chemical formula (1), thus decreasing the loss of the sacrificial anode 11 and extending the service life thereof.

In step S44, a photocatalytic reaction is conducted by the photocatalyst anode 12, such that the liquid produces another strong oxidizing agent (.OH) (i.e., the chemical formula (5)).

In step S45, the twice-purified liquid is outputted.

In the case that an aeration element 14 for providing additional gas to the liquid is provided in the chamber 104 of the container 10 of the composite water purification apparatus 1, additional gas (air or oxygen) necessary in the chemical formula (2) is provided by the aeration element 14 to the liquid in step S42, such that the liquid and the additional gas produces hydrogen peroxide at the cathode 13.

Compared to the prior art, by immersing the sacrificial anode, the photocatalyst anode, and the cathode all in the same container, the present invention allows the liquid to undergo degradation twice before being discharged, thereby enhancing the purification process of the liquid. Besides, the present invention allows the sacrificial ions in a higher oxidation state to be reduced back to a lower oxidation state at the cathode, thus reducing the number of the sacrificial ions in a lower oxidation state extracted from the sacrificial anode. The service life of the sacrificial anode is therefore extended.

The above embodiments are only used to illustrate the principles of the present invention, and should not be construed as to limit the present invention in any way. The above embodiments can be modified by those with ordinary skill in the art without departing from the scope of the present invention as defined in the following appended claims.

What is claimed is:

1. A composite water purification apparatus, comprising:
   a container for receiving a liquid including water and gas;
   at least one sacrificial anode;
   at least one photocatalyst anode including a photocatalyst for conducting a photocatalytic reaction to purify the liquid; and
   at least a cathode electrolyzed with the sacrificial anode and the photocatalyst anode to purify the liquid; and
   a light source electrically coupled to a power supply, wherein the light source and the photocatalyst anode conduct the photocatalytic reaction,
   wherein the sacrificial anode, the photocatalyst anode, and the cathode are immersed in the container to contact the liquid.

2. The composite water purification apparatus of claim 1, further comprising an aeration element provided in the container for feeding additional gas to the liquid, wherein the additional gas is air or oxygen.

3. The composite water purification apparatus of claim 1, wherein the photocatalyst anode includes a mesh substrate and a titanium dioxide layer on the mesh substrate.

4. The composite water purification apparatus of claim 1, wherein the sacrificial anode is made of iron or copper, and the cathode is made of a material including carbon.

5. The composite water purification apparatus of claim 1, further comprising a power supply electrically coupled to the photocatalyst anode, the sacrificial anode, and the cathode for conducting the electrolysis.

6. The composite water purification apparatus of claim 1, wherein the light source is an ultraviolet (UV) lamp.

7. The composite water purification apparatus of claim 1, further comprising a light-transmissive element positioned between the light source and the photocatalyst anode.

8. The composite water purification apparatus of claim 1, wherein the container includes an inlet, an outlet, a top part, a bottom part, and a lateral part connecting the top and the bottom parts, the top part, the bottom part, and the lateral part constitute a chamber for receiving the liquid, and the inlet, the sacrificial anode and the cathode, the photocatalyst anode, and the outlet correspond to a position of the top part, and are arranged in an order from an outer rim to a center of the top part.

9. A water purification method of using a composite water purification apparatus, comprising the following steps of:
   a) providing the composite water purification apparatus including a container, at least a sacrificial anode, at least a photocatalyst anode, a light source, and at least a cathode, wherein the photocatalyst anode includes a photocatalyst, the light source is electrically coupled to a power supply, and the sacrificial anode, the photocatalyst anode, and the cathode are immersed in the container;
   b) inputting a liquid including water and gas into the container, such that a photocatalytic reaction is conducted at the sacrificial anode, the sacrificial anode produces sacrificial ions in a lower oxidation state, and the cathode produces hydrogen peroxide ($H_2O_2$) by using the liquid and the gas;
   c) interacting sacrificial ions in a lower oxidation state with hydrogen peroxide to form sacrificial ions in a higher oxidation state, a strong oxidizing agent (.OH), and hydroxide ions (OH—), the strong oxidizing agent purifying the liquid;
   d) conducting a photocatalytic reaction, by the light source and the photocatalyst anode, such that the liquid produces another strong oxidizing agent (.OH); and
   e) outputting the purified liquid.

10. The water purification method of claim 9, wherein the composite water purification apparatus further comprises an aeration element disposed in the container, and the method, in step b), further comprises providing additional gas, by the aeration element, to the liquid, such that the liquid and the additional gas produce hydrogen peroxide at the cathode.

11. The water purification method of claim 9, wherein after the sacrificial ions in a higher oxidation state are formed in step c), the sacrificial ions in a higher oxidation state are reduced back to the sacrificial ions in a lower oxidation state at the cathode.

12. The water purification method of claim 9, wherein the photocatalyst anode includes a mesh substrate and a titanium dioxide layer on the mesh substrate.

13. The water purification method of claim 9, wherein the sacrificial anode is made of iron or copper, such that the sacrificial ions in a lower oxidation state are iron ions in an oxidation state of +2 ($Fe^{2+}$) or copper ions in an oxidation state of +1 ($Cu^+$), and the sacrificial ions in a higher oxidation state are iron ions in an oxidation state of +3 ($Fe^{3+}$) or copper ions in an oxidation state of +2 ($Cu^{2+}$).

14. The water purification method of claim 9, wherein the cathode is made of a material including carbon.

15. The water purification method of claim 9, wherein the sacrificial anode, the photocatalyst anode, and the cathode are electrically coupled to a power supply, such that that in step d) the power supply removes electrons isolated from the photocatalyst anode via the photocatalytic reaction.

16. The water purification method of claim 9, wherein the light source is an ultraviolet (UV) lamp, such that in step d) the light source and the photocatalyst anode conduct the photocatalytic reaction, and the composite water purification apparatus further comprises a light-transmissive element positioned between the light source and the photocatalyst anode.

17. The water purification method of claim 9, wherein the container includes an inlet, an outlet, a top part, a bottom part, and a lateral part connecting the top and the bottom parts, the top part, the bottom part, and the lateral part constitute a chamber for receiving the liquid, and the inlet, the sacrificial anode and the cathode, the photocatalyst anode, and the outlet correspond to a position of the top part, and are arranged in an order from an outer rim to a center of the top part.

* * * * *